Jan. 10, 1967   A. W. SALZMAN   3,297,371

JOURNAL BEARING

Filed Jan. 27, 1964   2 Sheets-Sheet 1

INVENTOR:
ALLEN W. SALZMAN
BY: Arthur J. Hanamann
ATTORNEY

INVENTOR:
ALLEN W. SALZMAN 3,297,371
          JOURNAL BEARING
Allen W. Salzman, Milwaukee, Wis., assignor to The
  Harris Corporation, Grafton, Wis., a corporation of
  Wisconsin
          Filed Jan. 27, 1964, Ser. No. 340,263
                2 Claims.  (Cl. 308—73)

This invention relates to a journal bearing, segmental shoe type of bearing.

Bearings of the segmental shoe type are generally well-known in the art. In the manufacture, assembly, and maintenance of these bearings, there is the problem and concern of retaining the shoes in their desired assembled position, and also the problem and concern of adequate lubrication of the shoes and alignment of the shoes with respect to the shaft being rotatably supported by the bearing. Of course these journal bearings must also be provided for durability and long life and a minimum of wear and resistance with respect to the supported shaft. Still further, the bearings must be provided for proper seals especially for retaining the oil within the bearing for the desired internal lubrication.

It is a general object of this invention to provide a journal bearing of the segmental shoe type which answers the afore-mentioned problems.

A more specific object of this invention is to provide a journal bearing of the segmental type wherein the shoes are retained within the housing without requiring any additional side plates or other members for retaining the shoes in the desired position during assembly and disassembly of the bearing.

Still a further object of this invention is to provide a bearing of the segmental shoe type wherein the shoes are supported directly on the housing, but are nevertheless free to move within the housing to adjust their position according to the forces applied to the shoe by the rotating shaft.

Still an additional object of this invention is to provide a journal bearing which is lubricated in a manner to provide adequate lubrication to the bearing parts which are in contact with the forces acting on the movable parts of the bearing and the rotating shaft therein.

Still a further object of this invention is to provide a bearing which does not require either projections or openings extending completely therethrough in the shoes of the bearing but which nevertheless has means for retaining the shoes in the desired assembled position with respect to the bearing housing. This particular object is accomplished without the requirement of special and additional parts for retaining the shoes in the housing, and therefore the entire bearing load is borne completely by the shoes supported only by the housing and neither the retaining pin nor the members holding the retaining pin carry any of the bearing load.

Other objects and advantages become apparent upon reading the following description in light of the accompanying drawing, wherein.

Figure 2:
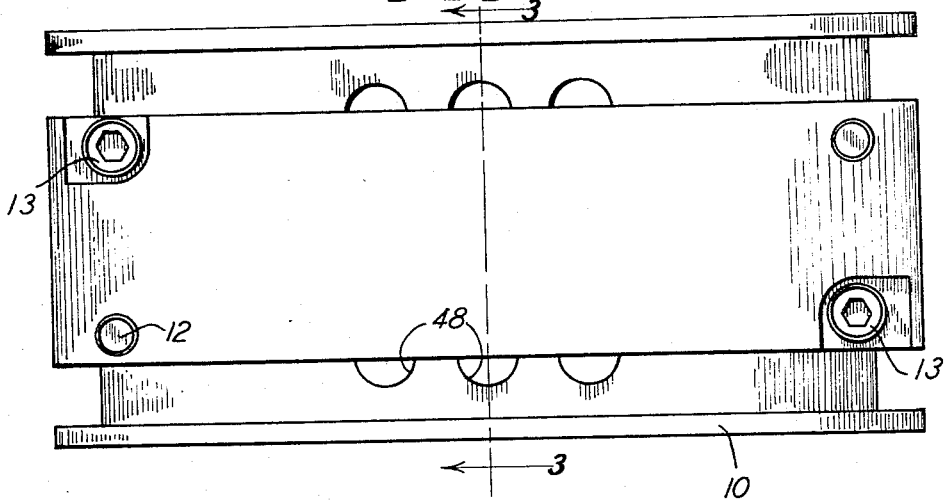
FIG. 2 is a plan view of the complete bearing of FIG. 1, shown from the top thereof.
Figure 1:
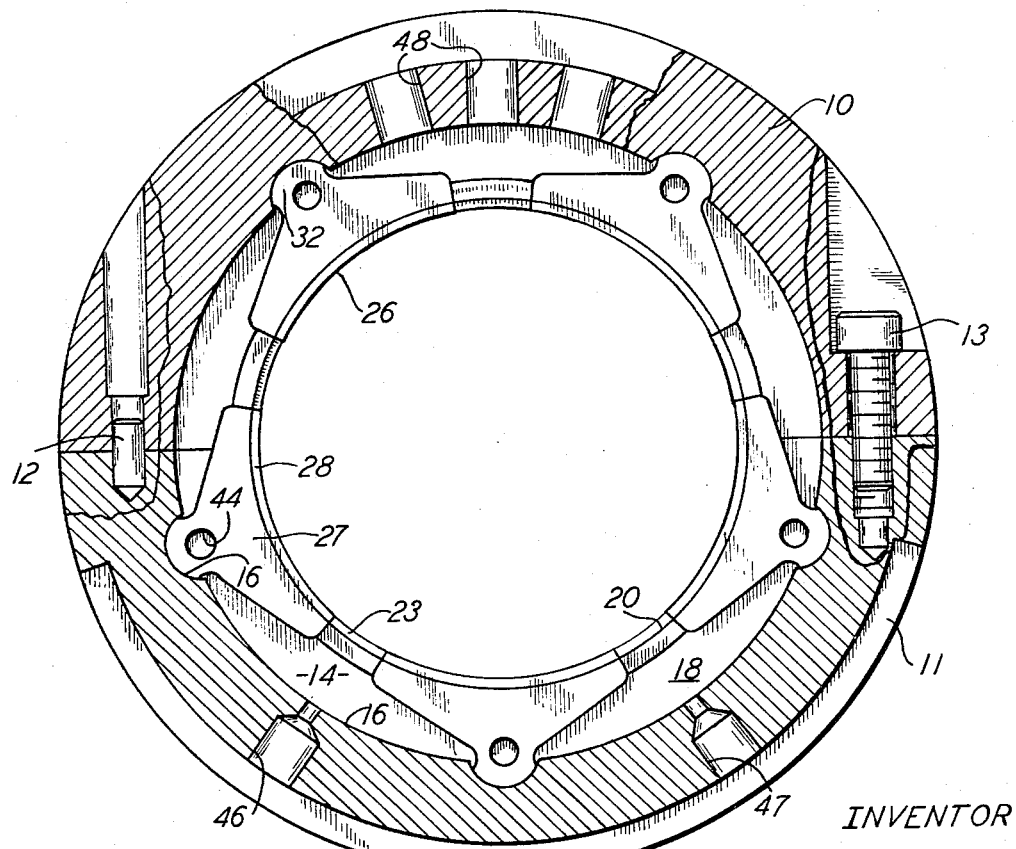
FIG. 1 is a sectional view of a preferred bearing of this invention with fragments thereof broken away, and with the section taken substantially along line 1—1 of FIG. 3.

The journal bearing is shown to consist of two housing halves 10 and 11 which are aligned in mating condition shown by means of alignment pins such as the pin 12. The halves 10 and 11 are then secured together by means of bolts such as the bolt 13 extending therebetween. The housing halves 10 and 11 are of course customarily disposed in a stationary mounting (not shown). The housing is thus shown to present an interior circular recess 14 defined by the circumferential wall 16 and the side walls 17 and 18 which are axially spaced apart on the housing halves 10 and 11.

The housing also presents interior recesses 19 and 21 which are formed in the circular interior opening 20 extending through the bearing housing. The recesses 19 and 21 receive circular seal rings 22 and 23 respectively for fluid tightly sealing the interior of the bearing in a manner that the interior can be pressurized with oil without having the oil leak axially of the seals 22 and 23.

Figure 3:
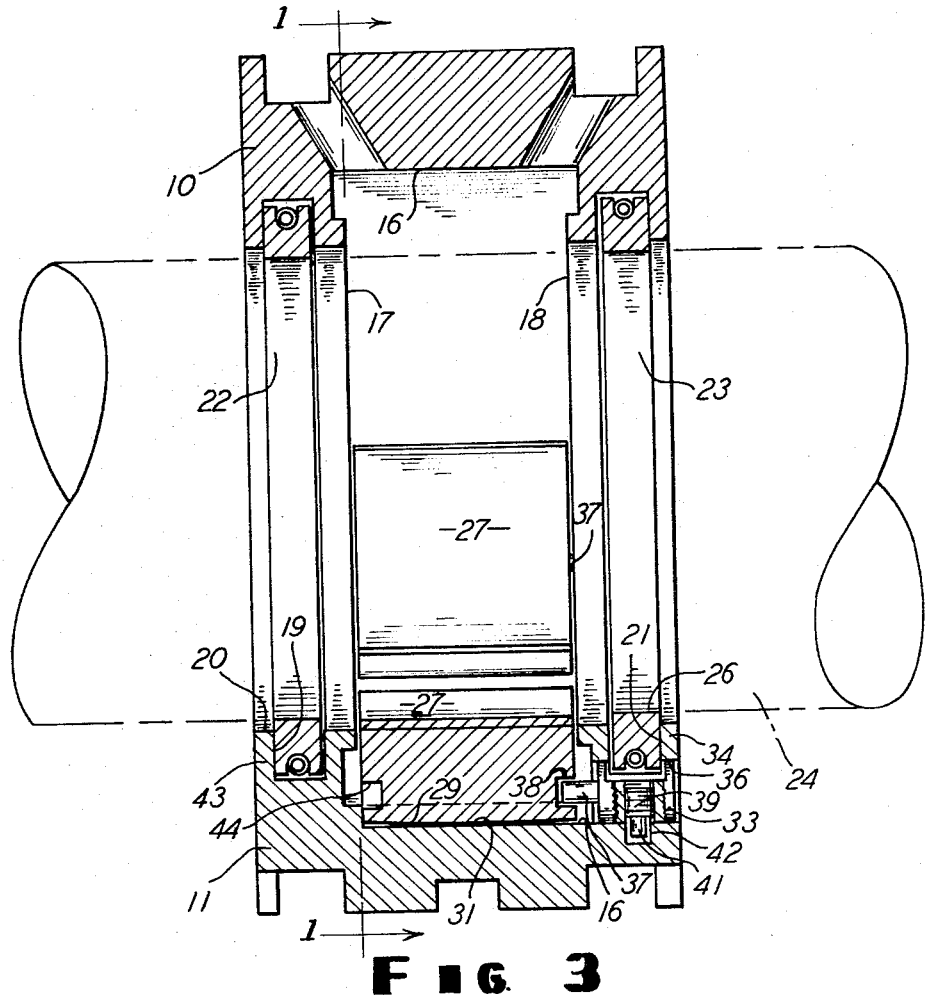
FIG. 3 is a sectional view taken along the line 3—3 of FIG. 2 and showing a shaft supported therein in dot-dash lines, with parts removed.

Of course, it will also be noted in FIG. 3 that the shaft 24 shown in dot-dash lines is rotatably supported in the bearing on the location of the inetrior surface 26 of the seals 22 and 23.

Of course, actually the manner of supporting the shaft 24 is through the segmental shoes 27 which are disposed in plurality around the bearing central opening 20 and within the recess 14. The shoes 27 are of course provided with wear resistant faces 28 which contact and thus actually support the shaft 24 in the well-known manner. Also, the radially outer surfaces 29 of the shoes 27 are disposed in circular pockets 31 formed in the housing. Thus the shoes 27 have substantially semi-circular bosses 32 on the radially outer sides thereof for a sliding or rotating type of surface contact in the pockets 31.

FIG. 3 shows that the shoe bosses 29 are arcuately disposed along the length thereof so that they can rock to adjust to the axial alignment of the shaft 24 as the shoes are rockable axially of the shaft and therefore the bearing housing. Of course the shoes 27 are also rockable in the direction transverse to that mentioned, namely in a direction around the axis defining the arcuate surfaces of the pockets 31 and the shoe outer surfaces 29. Therefore, the shoes rock in the two directions mentioned to adjust to the forces applied thereto by the shaft 24. Of course at this time it will also again be understood that the shoe is entirely supported by the housing, and it is therefore a sturdy and durable arrangement of the shoe within the housing.

Still the shoes 27 are securely retained within the housing by means of the pins 33 which extend through the housing portion 34 which includes the housing wall 18. Thus the inwardly projecting housing portion 34 has openings 36 therethrough for receiving the circular pins 33. The interior ends 37 of the pins 33 project into the pin holes 38 in the sides of the shoes 27 as shown in FIG. 3. In this manner the shoes 27 are retained in the housing as desired. Although of course the fit between the pin ends 37 and the shoe openings 38 is sufficiently loose so that no force applied to the shoes 27 by the shaft 24 is borne by the pins 33, nor of course the pin ends 37. The pins 33 are therefore for the sole purpose of simply retaining the shoes 27 against their own weight for assembly and disassembly of the bearing.

A set screw 39 extends through the pin 33 and has its projecting end 41 received in a hole 42 in the housing so that the pins 33 are axially located within the housing and therefore are secured therein by means of the set screws 39.

It will now be understood and appreciated that the shoes 27 are retained within the housing without requiring elaborate and detailed parts but only simply requiring the pins 33 which extend through the housing itself to contact the shoes 27 for the purpose mentioned. Of course the housing walls 17 and 18 retain the shoes 27, and the housing portion 34 along with the housing portion 43 actually serve to give axial support to the shoes 27 and no additional parts are needed for this purpose of support and retention of the shoes 27.

In this arrangement it will be noted that the shoes 27 have two side openings 38 and 44 so that the shoes can be placed in either direction within the housing to serve the purposes mentioned. Also it will be noted that oil inlet openings 46 and 47 are provided in the housing 11 and oil outlet openings 48 are provided in the housing half 10. Thus oil can enter the openings 46 and 47 and flow across the segments or shoes 27 of the bearing and exhaust through the outlet openings 48.

While a specific embodiment of this invention has been shown and described, it should be obvious that certain changes could be made in the embodiment, and the invention should therefore be limited only by the scope of the appended claims.

What is claimed is:

1. A bearing for supporting a rotating shaft, comprising in combination a housing of two halves separably mated together and having a circularly-shaped interior recess defined by axially spaced-apart walls on axially opposite sides of said recess and defined by a circular wall between said spaced-apart walls, said circular wall having pockets therein, a plurality of shoes disposed in said recess and spaced therealong for presenting a circular journal for a rotating shaft and including bosses disposed in said pockets and being in radial supporting contact with said pockets, the radially outer surfaces of said bosses in contact with said pockets being arcuate about axes in the directions both axially and transversely of said interior recess, said shoes having pin holes on one axial side thereof facing one of said walls and extending only part way into said shoes, said one of said walls having openings aligned with said pin holes, and pins disposed in said openings and extending into said pin holes and having clearance therein and being anchored to said housing for retaining said shoes to said housing.

2. A bearing for supporting a rotating shaft, comprising in combination a housing of two halves separably mated together and having a circularly-shaped interior recess defined by axially spaced-apart walls on axially opposite sides of said recess and defined by a circular wall between said spaced-apart walls, said circular wall having pockets therein, said housing having oil openings extending therethrough and into said interior recess for the flow of oil to and from said interior recess, seal rings disposed in said housing axially outside of said spaced-apart walls for retaining oil in said interior recess, a plurality of shoes disposed in said recess and spaced therealong for presenting a circular journal for a rotating shaft and including bosses disposed in said pockets and being in radial supporting contact with said pockets, the radially outer surfaces of said bosses in contact with said pockets being arcuate about axes in the directions both axially and transversely of said interior recess, said shoes having pin holes on one axial side thereof facing one of said walls and extending only part way into said shoes, said one of said walls having openings aligned with said pin holes, and pins disposed in said openings and extending into said pin holes and having clearance therein and being anchored to said housing for retaining said shoes to said housing.

References Cited by the Examiner

UNITED STATES PATENTS

| 1,161,721 | 11/1915 | Parsons | 308—73 |
| 1,870,857 | 8/1932 | Mathewson | 308—73 |

MARTIN P. SCHWADRON, *Primary Examiner.*

FRANK SUSKO, *Examiner.*